United States Patent
Bainotti (10) Patent No.: US 7,076,574 B2
(45) Date of Patent: Jul. 11, 2006

(54) METHOD AND SYSTEM FOR DISCONNECTING A SPECIFIC CHANNEL OF A SCSI CONTROLLER

(75) Inventor: Rodrigo Bainotti, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 474 days.

(21) Appl. No.: 10/256,867

(22) Filed: Sep. 26, 2002

(65) Prior Publication Data
US 2004/0064614 A1    Apr. 1, 2004

(51) Int. Cl.
*G06F 3/00* (2006.01)
(52) U.S. Cl. .......................... 710/19; 710/107; 710/8; 709/221
(58) Field of Classification Search .............. 710/8, 710/10–11, 15, 313, 300, 105, 62; 709/220
See application file for complete search history.

(56) References Cited

U.S. PATENT DOCUMENTS

| 5,838,950 A * | 11/1998 | Young et al. ................. 703/21 |
| 6,557,049 B1 * | 4/2003 | Maloy et al. .................. 710/8 |
| 6,757,774 B1 * | 6/2004 | Benson et al. ............... 710/305 |
| 6,851,007 B1 * | 2/2005 | Whitt et al. ................. 710/305 |

* cited by examiner

Primary Examiner—Tim Vo
Assistant Examiner—Clifford Knoll (57) ABSTRACT

A method for disconnecting a channel of a SCSI (small computer system interface) controller from a SCSI bus is disclosed. The method includes receiving a signal that prompts the SCSI controller to assume a mode that the SCSI controller is not configured to accommodate. Further, the method includes disabling a channel of the SCSI controller by entering a state that disconnects the channel of the SCSI controller from the SCSI bus.

42 Claims, 8 Drawing Sheets

METHOD AND SYSTEM FOR DISCONNECTING A SPECIFIC CHANNEL OF A SCSI CONTROLLER

FIELD OF THE INVENTION

The present invention relates generally to SCSI controllers. In particular, an embodiment of the present invention relates to a method and system for disconnecting a specific channel of a SCSI controller.

BACKGROUND OF THE INVENTION

Small computer system interface (SCSI) is a set of standard electronic interfaces that allow personal computers to communicate with peripheral hardware such as disk drives, tape drives, CD-ROM drives, printers scanners faster and more flexibly than previous interfaces. Conventional SCSIs employ parallel interfaces. SCSI ports continue to be built into many personal computers today and are supported by all major operating systems.

In addition to faster data rates, SCSI is more flexible than earlier parallel data transfer interfaces. The SCSI standard can transfer data at up to 80 megabytes per second (MBps). SCSI allows up to 7 or 15 devices (depending on bus width) to be connected to a single SCSI port in a daisy chain fashion. This allows one circuit board or card to accommodate all the peripherals rather than having a separate card for each device, making it an ideal interface for use with portable and notebook computers. A single host adapter in the form of a PC card can serve as a SCSI interface for a laptop, freeing up the parallel and serial ports for use with an external modem and printer while allowing other devices to be used in addition.

A widely implemented SCSI standard uses a 40 MHZ clock rate to raise data transfer rates up to 80 MBps. It provides a longer possible cabling distance (up to 12 meters) by using low voltage differential (LVD) signaling. Earlier forms of SCSI use a single wire that ends in a terminator with a ground, called single ended (SE) signaling. LVD sends the signal over two wires with the data represented as the difference in voltage between the two wires. This allows support for longer cables. Low voltage differential reduces power requirements and manufacturing costs. High voltage differential (HVD) is another SCSI standard that has been widely implemented. Conventionally, SCSI systems have been designed to employ these standards either individually or in combination. However, more recently the LVD and SE standards have gained in popularity while many SCSI devices such as SCSI controllers do not support the HVD standard.

SCSI systems that employ a plurality of SCSI devices to communicate with a single peripheral device have encountered substantial problems. One problem is the inability to easily disconnect a specific channel of one SCSI controller without affecting other SCSI controllers connected to a SCSI bus, or the other SCSI channel resident on the same SCSI controller. Using conventional methodologies an entire controller must be disconnected in order to disconnect a specific channel of a SCSI controller. As is suggested, this is disadvantageous for dual channel SCSI controllers and involves the physical removal of the SCSI controller containing the specific channel desired disconnected.

SUMMARY OF THE INVENTION

A method for disconnecting a channel of a SCSI (small computer system interface) controller from a SCSI bus is disclosed. The method includes receiving a signal that prompts the SCSI controller to assume a mode that the SCSI controller is not configured to accommodate. Further, the method includes disabling a channel of the SCSI controller by entering a state that disconnects the channel of the SCSI controller from the SCSI bus.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of test procedures, logic blocks, processing, and other symbolic representations of operations on data bits within a computer system or electronic computing device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving" or "disabling" or the like, refer to the action and processes of a computer system, or similar electronic computing device, that manipulates and transforms data. For example, the data is represented as physical (electronic) quantities within the computer system's registers and memories and is transformed into other data similarly represented as physical quantities within the computer system memories or registers or other such information storage, transmission, or display devices.

Disconnecting a Specific Channel of a SCSI Controller

Figure 1:
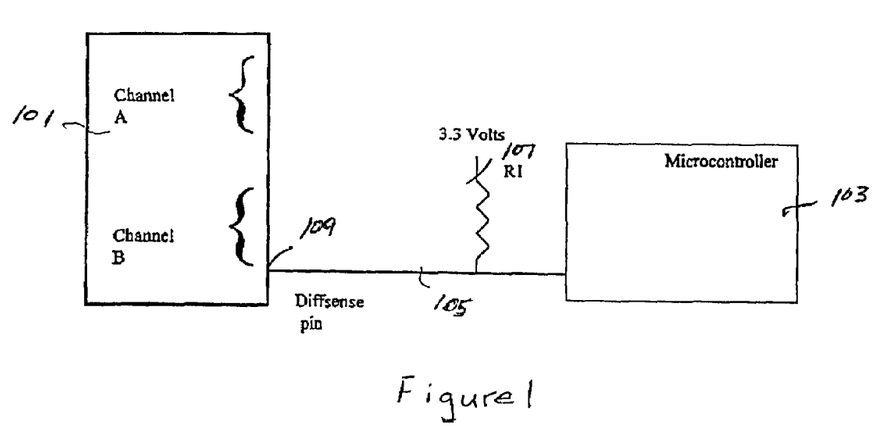
FIG. 1 is a block diagram of a SCSI controller and micro-controller network according to one embodiment of the present invention.

FIG. 1 is a block diagram of a SCSI (small computer system interface)controller and micro-controller network according to one embodiment of the present invention. Embodiments of the present invention allow the disconnecting of an individual channel of a SCSI controller from a SCSI bus without having to disconnect the entire controller from the bus. Consequently, a second channel of the same controller may not be affected by such operations. Referring to FIG. 1, there is shown SCSI controller 101, micro-controller 103, diffsense line 105, resistor R1 107, and diffsense pin 109.

SCSI controller 103 includes two channels (see FIG. 1, channel A and channel B) and a signal receiving pin 109 (e.g., diffsense pin 109) associated with channel B. According to one embodiment, the SCSI controller may be employed to communicate with external devices such DVDs, or other peripheral hardware that may be connected to the SCSI controller via one of the controller's channels. The diffsense pin 109 may be employed to facilitate the electrical disconnection of a channel from its bus. The disconnection or connection of a channel from its bus may be effectuated by placing a predetermined voltage level on a diffsense pin associated with that channel as is described below.

Microcontroller 103 may be programmed to place voltages on signal transmitting line 105 (e.g., diffsense line 105) by transmitting a signal via a general I/O pin (not shown). It should be appreciated that according to exemplary embodiments, placing a voltage on the diffsense line 105 that corresponds to a mode that the SCSI controller can support electrically connects the associated channel (channel B) of the SCSI controller (e.g., 101) to the SCSI bus. Conversely, placing a voltage on the diffsense line (e.g. 105) that corresponds to a mode that the SCSI controller cannot support electrically disconnects the associated channel of the SCSI controller from the SCSI bus. According to exemplary embodiments because a SCSI controller may support operation in the SE (single ended) or LVD (low voltage differential) SCSI mode, when a diffsense line (e.g., 105) voltage is pulled to voltage levels (i.e., ground, etc.) corresponding to these modes of operation an associated SCSI channel (i.e., channel B) may be connected. However, the associated SCSI channel may be electrically disconnected when an attempt is made to place a voltage on the diffsense line that corresponds to a HVD (high voltage differential) SCSI mode, as this mode of operation may not be supported by the SCSI controller according to one embodiment. The voltage level required to place the SCSI controller in an HVD (high voltage differential) SCSI mode may include but is not limited to 3.3 volts.

Referring to again to FIG. 1, the diffsense line 105 shown as being connected to channel B of SCSI controller 101, may be subjected to a voltage level corresponding to a mode not supported by the SCSI controller 101 via a resistor R1 (e.g., 107). According to exemplary embodiments, when the diffsense line 105 is subjected to such, the controller can tri-state its SCSI signals for that channel (channel B in FIG. 1) of the controller, in essence electrically disconnecting the channel from the rest of the SCSI bus.

Figure 2:
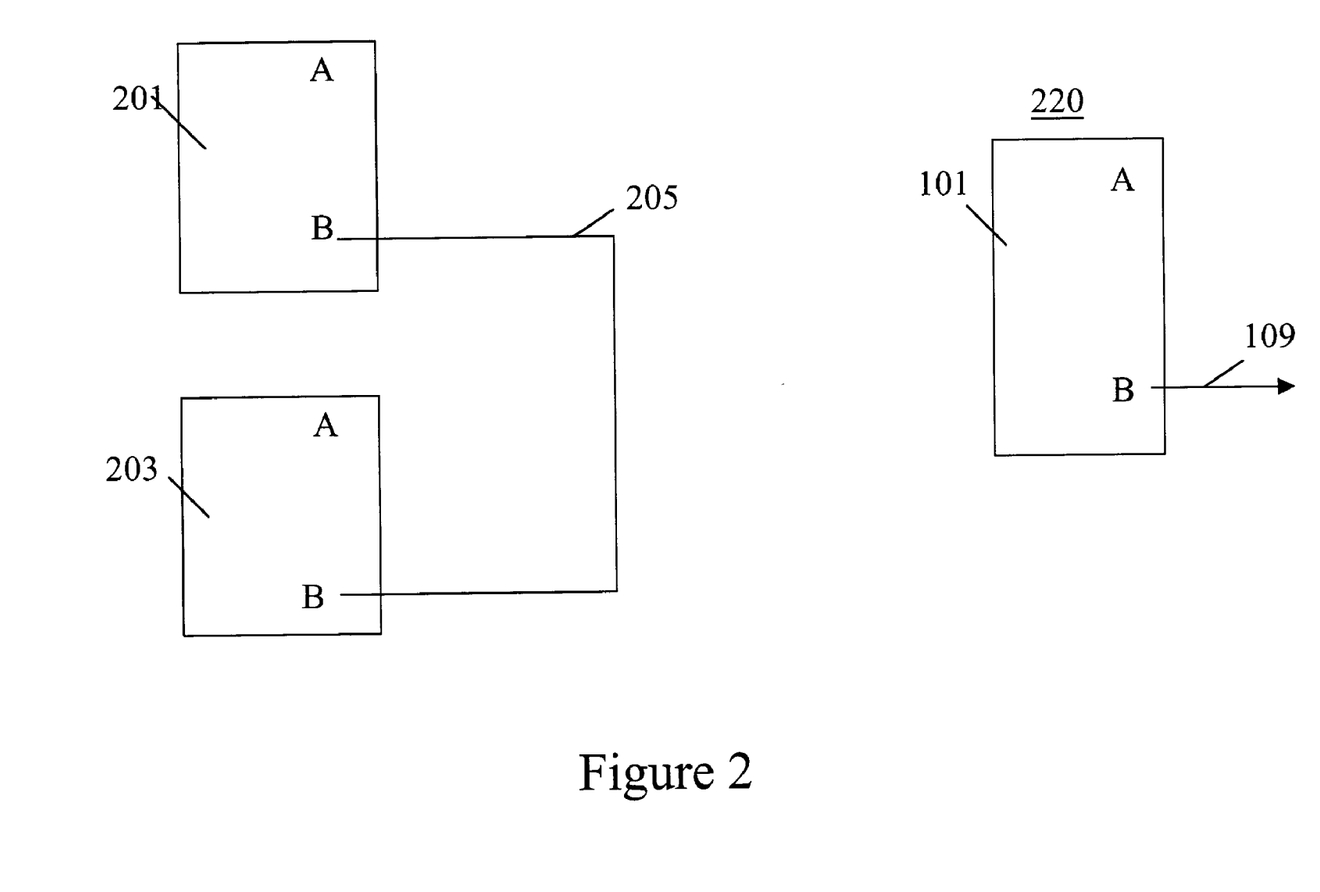
FIG. 2 shows exemplary SCSI controller configurations according to one embodiment of the present invention.

FIG. 2 shows exemplary SCSI controller configurations according to one embodiment of the present invention. According to exemplary embodiments of the present invention multi-initiator or single initiator SCSI controller configurations may be employed to affect the disconnection of a specific SCSI controller channel. FIG. 2 illustrates a multi-initiator configuration 200 that includes SCSI controllers 201 and 203 and diffsense line 205, and single initiator configuration 220 that includes SCSI controller 101 and diffsense line 109. Also shown are the channels A and B of each SCSI controller. It should be appreciated that each channel may have an associated diffsense pin (not shown for channel A) that may be employed to enable or disable its associated channel.

The single initiator configuration 220 (also shown FIG. 1) employs a single SCSI controller 101 that includes two channels (A and B). As previously discussed, the disconnection and connection of a specific channel of the SCSI controller from the SCSI bus that it is connected to may be effectuated by placing a voltage level on the diffsense pin (e.g., 109) that is associated with that channel that corresponds to modes that either can or cannot be supported by the SCSI controller. Software may be employed to control these operations.

The multi-initiator configuration 200 employs two or more SCSI controllers. According to one embodiment, the multi-initiator configuration may be packaged as a PCI (peripheral component interconnect)—SCSI chip. In other embodiments, other packaging schemes may be employed. According to exemplary embodiments, transitioning from the multi-initiator configuration to the single initiator configuration may be effectuated without physically disconnecting any of the SCSI controllers included in the arrangement.

Figure 3:
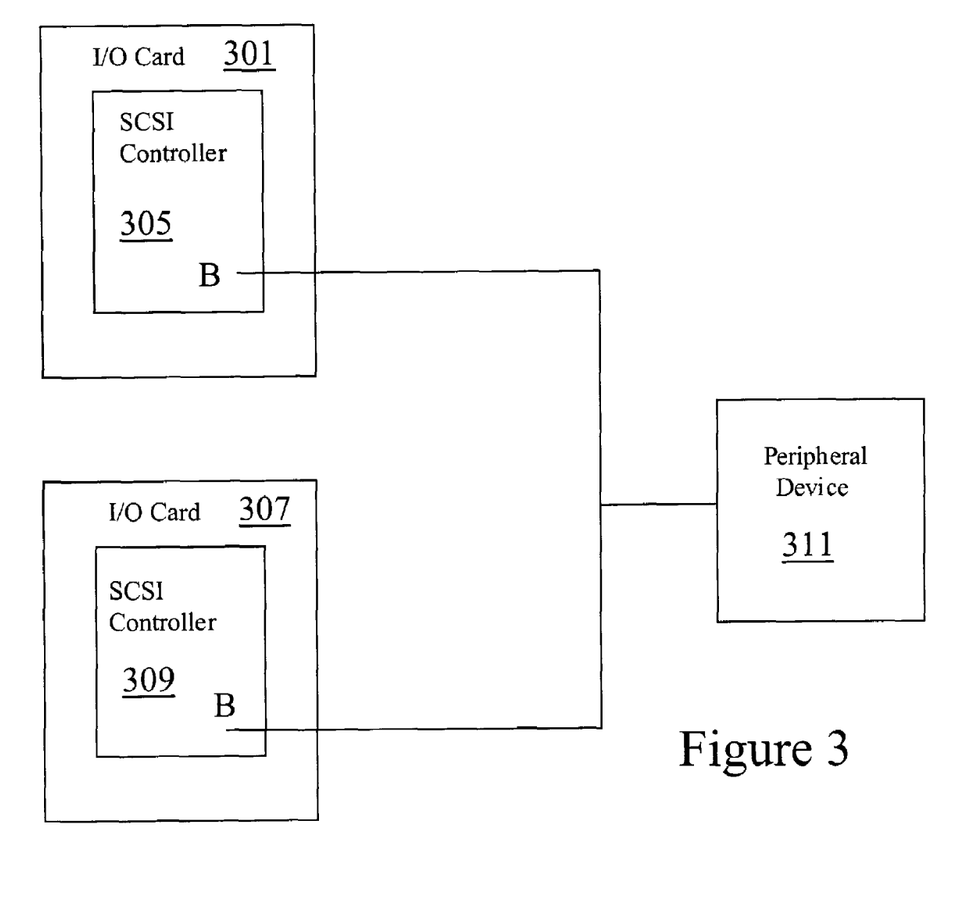
FIG. 3 illustrates a use of a multi initiator SCSI controller according to one embodiment of the present invention.

FIG. 3 illustrates a use of a multi initiator SCSI controller configuration according to one embodiment of the present invention. Multi-initiator configured SCSI controllers may be employed to communicate with peripheral hardware such as disk drives, tape drives, CD ROM drives, etc. FIG. 3 shows an application where a multi initiator configured SCSI controller is connected to a peripheral device. FIG. 3 shows I/O (input/output) card 301, SCSI controller 305, I/O card 307, SCSI controller 309 and peripheral device 311.

As is shown FIG. 3, SCSI controllers 305 and 309, located on I/O cards 301 and 307 respectively, are configured to have their channel A terminal connected to internal disks (not shown) and their channel B terminal connected to a single peripheral device 311. The multi-initiator configuration is effectuated when individual channels of the two SCSI controllers are connected via the same SCSI bus to a single peripheral device. According to one embodiment of the present invention, a specific channel (channel B in FIG. 3) of one of the SCSI controllers residing on one of the I/O cards may be disabled in order to affect the channels electrical disconnection from the SCSI bus as is herein described.

It should be appreciated that the SCSI controllers of the present invention may be prompted to assume three modes of operation: LVD (low voltage differential), HVD (high voltage differential), and SE (single ended). Moreover, a specific channel of the SCSI controller may be prompted to enter either of these three modes by placing a voltage of a predetermined value corresponding to one of the modes on the diffsense pin of that channel of the SCSI controller. According to exemplary embodiments of the present invention, the diffsense pin of the SCSI controller may be opportunistically subjected to a voltage corresponding to a mode that the SCSI controller is not configured to accommodate or support (e.g., the HVD mode). Because the SCSI controller may not support this mode of operation, the SCSI controller may tri-state (electrically disconnecting the channel from the rest of the SCSI bus) the SCSI input of that channel thereby electrically disconnecting that specific channel from the bus.

According to exemplary embodiments, a general I/O pin (not shown) may be used to set the voltage level of the diffsense line. The utilization of a general purpose I/O pin of a signal transmitting device (which may house software) to set the voltage level of the diffsense line that is coupled to the diffsense pin of a SCSI controller channel facilitates the use of software to enable or disable a SCSI channel as is desired.

Figure 4:
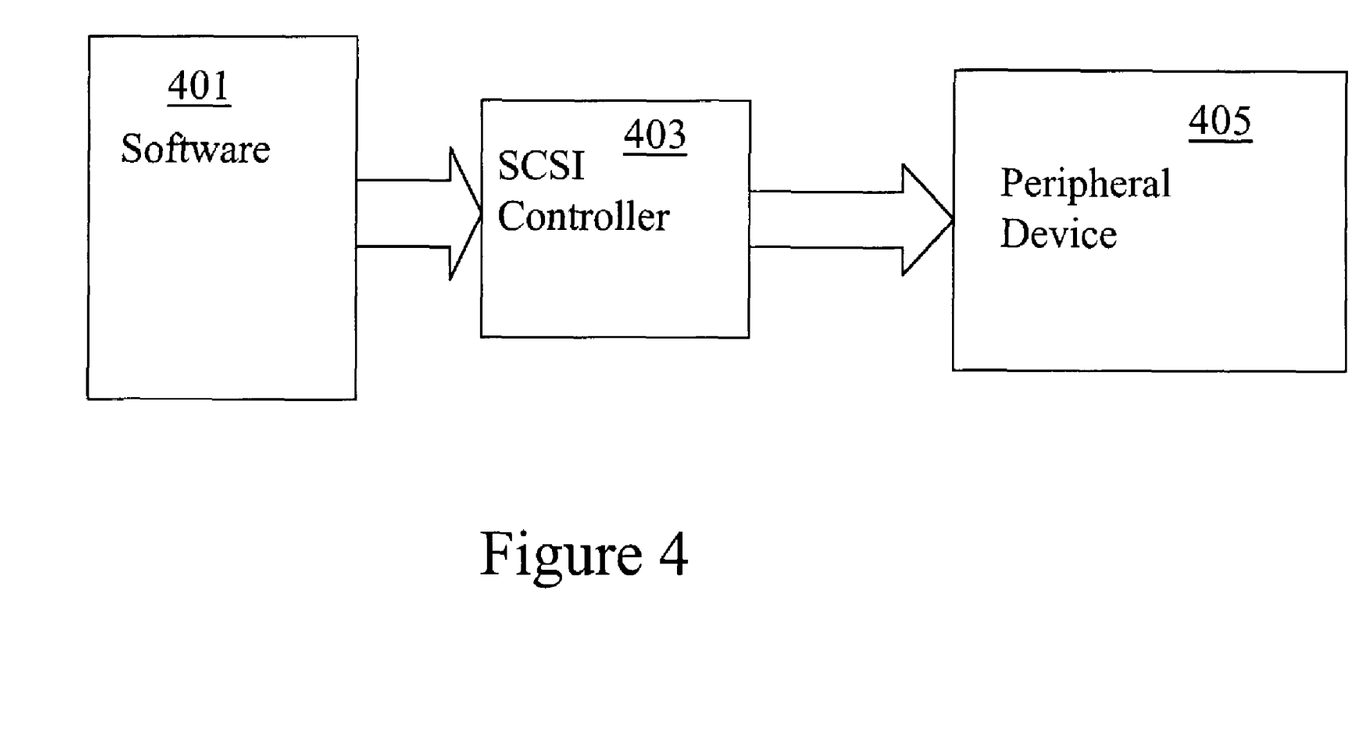
FIG. 4 is a functional block diagram illustrating the interrelationship of system components according to one embodiment of the present invention.

FIG. 4 is a functional block diagram illustrating the interrelationship of system components according to one embodiment of the present invention. According to exemplary embodiments, software may be employed to control the enabling and disabling of specific SCSI controller channels that may be communicatively coupled to peripheral devices. FIG. 4 shows software 401, SCSI controller 403, and peripheral device 405.

Software 401, may be employed to control the enabling and disabling of a specific SCSI controller 403 channel. SCSI controller 403 receives communications that are generated by software 401 and are transmitted to the SCSI controller via a general input/output (I/O) pin that facilitates the pulling up or down of the diffsense line associated with a channel that is coupled to the SCSI controller. A specific channel of the SCSI controller may thereby be enabled or disabled as is desired. According to embodiments of the present invention, the peripheral device 405 may be disconnected from a SCSI controller by a disabling of the specific channel that is coupled to the peripheral device 405. Conversely, the peripheral device 405 may be connected to a SCSI controller 403 by enabling the specific channel that is coupled to the peripheral device 405.

Exemplary Operations in Accordance with
Embodiments of the Invention

Figure 5:
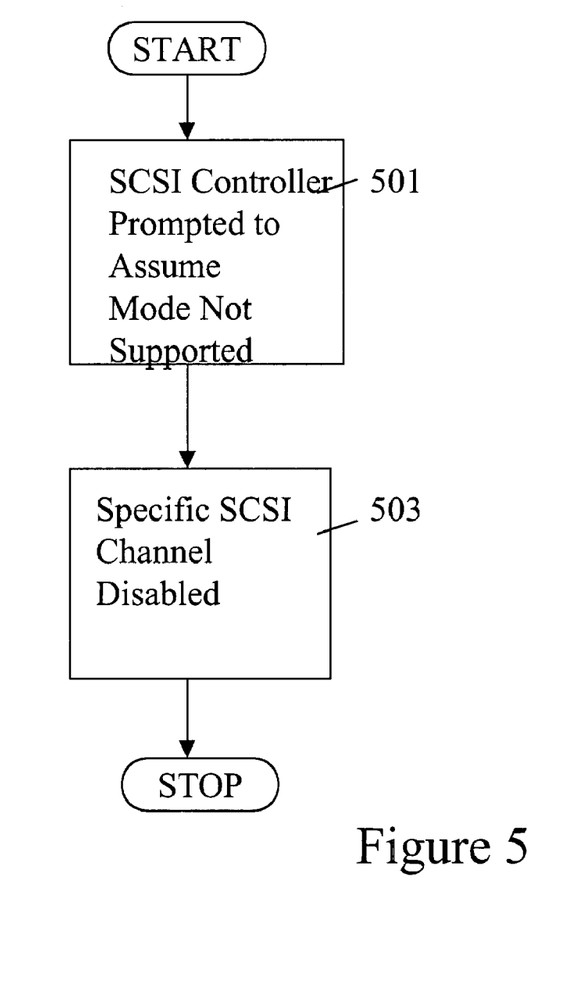
FIG. 5 is a flowchart of the steps performed in a process for disabling a SCSI controller channel according to one embodiment of the present invention.
Figure 6A:
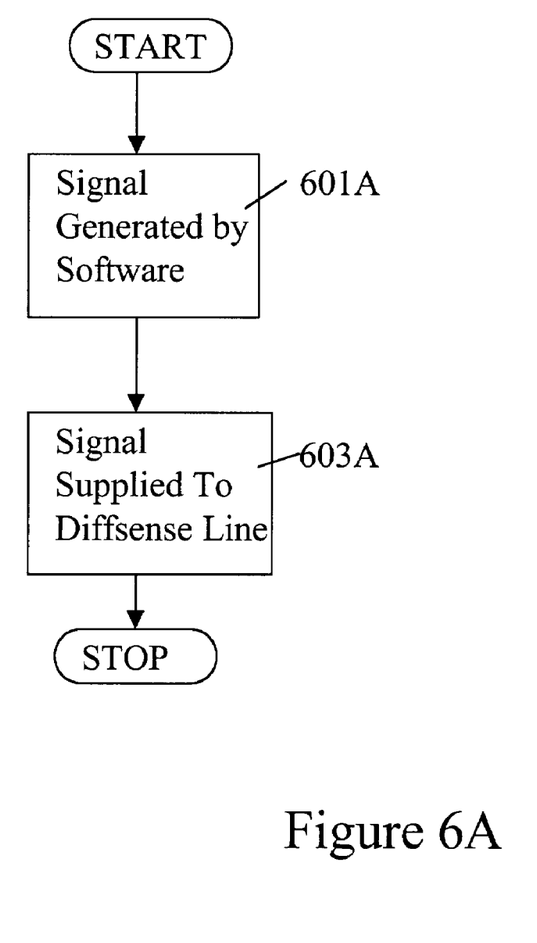
FIG. 6A is a flowchart of the steps performed in a process for disabling a SCSI controller channel according to one embodiment of the present invention.
Figure 6B:
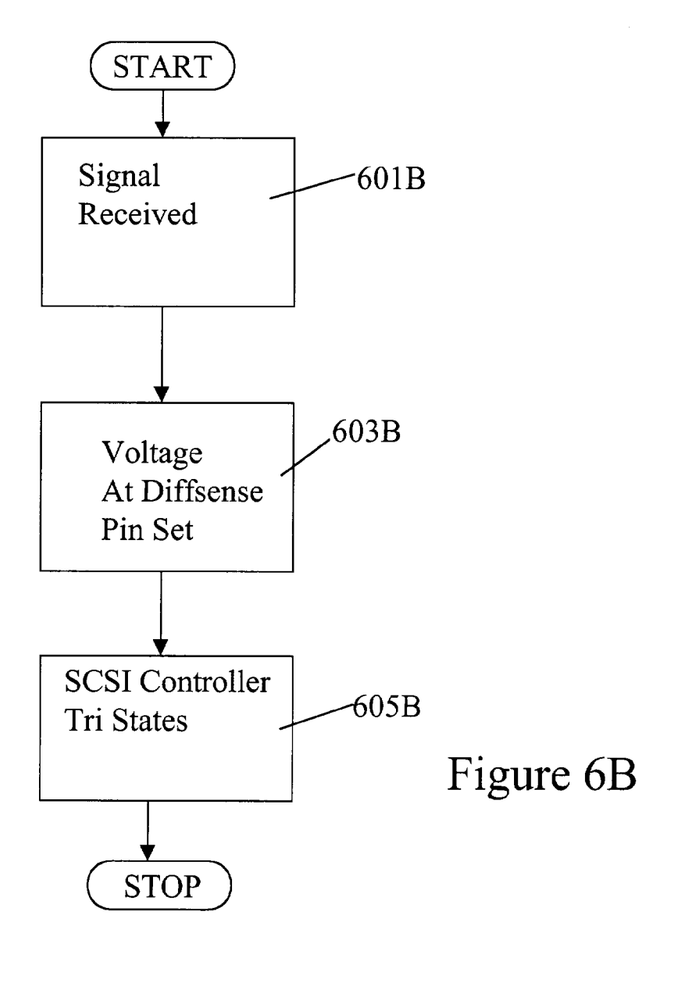
FIG. 6B is a flowchart of the steps performed in a process for disabling a SCSI controller channel according to one embodiment of the present invention.

FIGS. 5–6B show flowcharts of steps executed in computer controlled methods for disconnecting a specific channel of a SCSI controller. The flowcharts include processes of the present invention which, in one embodiment, are carried out by processors and electrical components under the control of computer readable and computer executable instructions. The computer readable and computer executable instructions reside, for example, in data storage features such as computer usable volatile memory and/or computer usable non-volatile memory (e.g. 704 and 706 described herein with reference to FIG. 7). However, the computer readable and computer executable instructions may reside in any type of computer readable medium. Although specific steps are disclosed in the flowcharts, such steps are exemplary. That is, the present invention is well suited to performing various other steps or variations of the steps recited in the flowcharts. Within the present embodiment, it should be appreciated that the steps of the flowcharts may be performed by software, by hardware or by a combination of both.

FIG. 5 is a flowchart of the steps performed in a process for disabling a SCSI controller channel according to one embodiment of the present invention.

At step 501, the SCSI controller is prompted to assume a mode that it is not configured to accommodate. According to exemplary embodiments this may be accomplished by placing a predetermined voltage that corresponds to a mode that the SCSI controller cannot accommodate on a SCSI controller diffsense pin associated with a channel of the SCSI controller. According to one embodiment, the voltage may be supplied by a microcontroller to a diffsense line (e.g., 105 shown as being connected to channel B of SCSI controller 101 in FIG. 1) that is coupled to a diffsense pin associated with a channel of the SCSI controller. According to exemplary embodiments, when the diffsense line (e.g., 105) is pulled to the predetermined voltage, the controller may tri-state its SCSI signals for that channel (e.g., channel B in FIG. 1) of the controller, in essence electrically disconnecting the channel from the rest of the SCSI bus.

At step 503, a specific SCSI controller channel is disabled. According to one embodiment, the SCSI controller may tri-state its SCSI signals for a specific channel in response to the prompting of step 501, in effect disconnecting that channel from the SCSI bus as described above. It should be appreciated that SCSI controllers such as described herein may be prompted to assume three modes of operation: LVD (low voltage differential), HVD (high voltage differential), and SE (single ended). Moreover, a channel of a SCSI controller may be prompted to enter either of these three modes by placing a voltage of a predetermined value corresponding to a particular mode of operation on the diffsense pin of the SCSI controller associated with that channel. It should be appreciated that in this manner a diffsense pin that is associated with a specific channel may be subjected to a voltage level corresponding to a mode that the SCSI controller is not configured to accommodate (e.g., the HVD mode). Because the SCSI controller may not support such modes of operation, the controller may tri-state (electrically disconnect the channel from the rest of the SCSI bus) the channel's SCSI input and electrically disconnect the channel from the bus.

FIG. 6A is a flowchart of the steps performed in a process for disabling a SCSI controller channel according to one embodiment of the present invention.

At step 601A, a signal configured to drive a pin of a SCSI controller to a predetermined voltage level corresponding to a mode of operation that the SCSI controller can not accommodate is generated by system software.

According to one embodiment, the software may be a part of a microcontroller implementation (see FIG. 1). In other embodiments, other implementations may be employed.

At step 603A, the signal configured to drive a pin of a SCSI controller to a predetermined voltage level is supplied to a diffsense line attached to a diffsense pin of the SCSI controller. This signal may be transmitted via a general input/output (I/O) pin of a signal transmitting device and may facilitate the placing of a predetermined voltage corresponding to a mode of operation that the SCSI controller can not accommodate on a diffsense line that is coupled to a diffsense pin of the SCSI controller.

FIG. 6B is a flowchart of the steps performed in a process for disabling a SCSI controller channel according to one embodiment of the present invention.

At step 601B, a SCSI controller (e.g., 403) receives a software generated communication (e.g., 401) that may be transmitted via a general input/output (I/O) pin of a signal transmitting device. The I/O pin facilitates the placement of a predetermined voltage on a diffsense line that is coupled to a diffsense pin associated with a specific channel of the SCSI controller. A specific channel of the SCSI controller may thereby be enabled or disabled as desired. According to embodiments of the present invention, a peripheral device (e.g., 405) may be disconnected from the SCSI controller by the disabling of the specific channel that is coupled to the peripheral device (e.g., 405).

At step 603B, the voltage level at the diffsense pin associated with a specific channel of the SCSI controller is driven to a predetermined value by the signal received in step 601. It should be appreciated that SCSI controllers may employ several modes of operation. These modes of operation include, LVD (low voltage differential), HVD (high voltage differential), and SE (single ended). A channel of the SCSI controller may be placed into either of these three modes by setting the voltage of the diffsense line attached to the diffsense pin associated with that channel to a predetermined value. In this manner, the controller channel may be prompted to operate in a desired mode. According to exemplary embodiments, by placing a voltage level that corresponds to a mode of operation that the SCSI controller cannot accommodate on the diffsense pin associated with a specific channel of the SCSI controller, that specific SCSI controller channel may be prompted to assume an unsupported configuration. However, because the SCSI controller may not support this mode of operation, the SCSI controller in such cases may be prompted to tri-state (electrically disconnect the channel from the rest of the SCSI bus) the channel's SCSI input thereby effectively disconnecting the channel from the bus.

At step 605B, the SCSI controller tri-states a specific SCSI channel. The tri-state condition may be employed to control the disabling of a specific SCSI controller channel. At step 605B the SCSI controller (e.g., 403) may receive software generated communications (e.g., 401) that correspond to a mode of operation that the SCSI controller cannot accommodate. These signals may be transmitted to the SCSI controller via a general input/output (I/O) pin of a signal transmitting device and placed on a diffsense line that is coupled to a diifsense pin associated with a specific channel of the SCSI controller. By thereby causing the SCSI controller channel to tri state, a specific channel of the SCSI controller may be disabled as desired. According to embodiments of the present invention, a peripheral device (e.g., 405) may be disconnected from the SCSI controller by the disabling of the specific channel that is coupled to the peripheral device (e.g., 405).

Exemplary Hardware in Accordance with
Embodiments of the Present Invention

Figure 7:
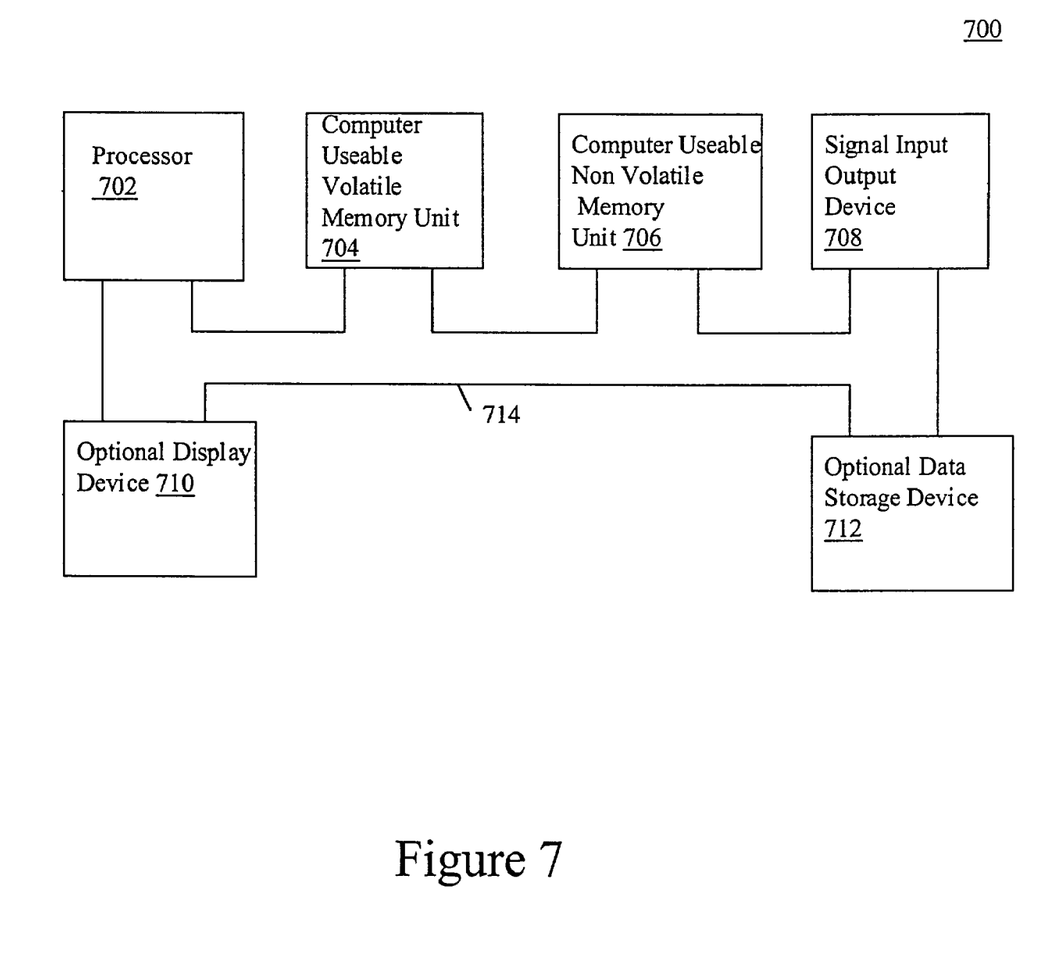
FIG. 7 is a block diagram of an embodiment of an exemplary computer system used in accordance with the present invention.

FIG. 7 is a block diagram of an embodiment of an exemplary computer system 700 used in accordance with the present invention. It should be appreciated that system 700 is not strictly limited to be a computer system. As such, system 700 of the present embodiment is well suited to be any type of computing device (e.g., server computer, portable computing device, etc.). Within the following discussions of the present invention, certain processes and steps are discussed that are realized, in one embodiment, as a series of instructions (e.g., software program) that reside within computer readable memory units of computer system 700 and executed by a processor(s) of system 700. When executed, the instructions cause computer 700 to perform specific actions and exhibit specific behavior which is described in detail below.

Computer system 700 of FIG. 7 comprises an address/data bus 710 for communicating information, one or more central processors 702 coupled with bus 710 for processing information and instructions. Central processor unit 702 may be a microprocessor or any other type of processor. The computer 700 also includes data storage features such as a computer usable volatile memory unit 704 (e.g., random access memory, static RAM, dynamic RAM, etc.) coupled with bus 710 for storing information and instructions for central processor(s) 702, a computer usable non-volatile memory unit 706 (e.g., read only memory, programmable ROM, flash memory, EPROM, EEPROM, etc.) coupled with bus 710 for storing static information and instructions for processor(s) 702. System 700 also includes one or more signal generating and receiving devices 708 coupled with bus 710 for enabling system 700 to interface with other electronic devices. The communication interface(s) 708 of the present embodiment may include wired and/or wireless communication technology. For example, in one embodiment of the present invention, the communication interface 708 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

Optionally, computer system 700 can include an alphanumeric input device 714 including alphanumeric and function keys coupled to the bus 710 for communicating information and command selections to the central processor(s) 702. The computer 700 can include an optional cursor control or cursor directing device 716 coupled to the bus 710 for communicating user input information and command selections to the central processor(s) 702. The system 700 can also include a computer usable mass data storage device 718 such as a magnetic or optical disk and disk drive (e.g., hard drive or floppy diskette) coupled with bus 710 for storing information and instructions. An optional display device 712 is coupled to bus 710 of system 700 for displaying video and/or graphics.

As noted above with reference to exemplary embodiments thereof, the present invention sets forth a method for disconnecting a specific channel of a SCSI controller from a SCSI bus is disclosed. The method includes receiving a signal that prompts the SCSI controller to assume a mode that it is not configured to accommodate. Further, the method includes disabling a specific channel of the SCSI controller by entering a state that effectively disconnects the specific channel of the SCSI controller from the SCSI bus.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for disconnecting a channel of a SCSI (small computer system interface) controller from a SCSI bus comprising:
   receiving a signal that prompts said SCSI controller to assume a mode that said SCSI controller is not configured to accommodate; and
   disabling a channel of said SCSI controller by entering a state that disconnects said channel of said SCSI controller from said SCSI bus.

2. The method of claim 1, wherein said receiving comprises receiving a software generated communication which facilitates the pulling up or pulling down of a signal transmitting line that is coupled to said SCSI controller.

3. The method of claim 2, wherein said disabling comprises driving the voltage level at a signal receiving pin coupled to said CSI controller to a predetermined value with said software generated communication.

4. The method of claim 1, wherein said state comprises a tri-state condition.

5. The method of claim 4, wherein said SCSI controller is comprised of two channels.

6. The method of claim 5, wherein said channel can be enabled by driving a voltage level at a signal receiving pin to a predetermined voltage level.

7. The method of claim 1, wherein said SCSI controller is configured to operate in LVD (low voltage differential) and SE (single ended) modes.

8. The method of claim 7, wherein said mode that said SCSI controller is not configured to accommodate is an HVD (high voltage differential) mode.

9. The method of claim 8, wherein said bus connects two or more SCSI controllers in a multi-initiator configuration, or a single controller in a single initiator configuration.

10. A SCSI controller comprising a processor and computer useable medium having computer useable code embodied therein causing said processor to perform operations comprising:
    assessing a signal that prompts said SCSI controller to assume a mode that said SCSI controller is not configured to accommodate; and
    disconnecting a channel of said SCSI controller by entering a state that disables said channel of said SCSI controller from said SCSI bus.

11. The SCSI controller of claim 10, wherein said assessing comprises receiving a software generated communication which facilitates the pulling up or pulling down of a signal transmitting line that is coupled to said SCSI controller.

12. The SCSI controller of claim 11, wherein said disconnecting comprises driving the voltage level at a signal receiving pin coupled to said SCSI controller to a predetermined value with said software generated communication.

13. The SCSI controller of claim 10, wherein said state comprises a tri-state condition.

14. The SCSI controller of claim 13, wherein said SCSI controller is comprised of two channels.

15. The SCSI controller of claim 14, wherein said channel can be enabled by driving a voltage level at a signal receiving pin to a second predetermined voltage level.

16. The SCSI controller of claim 10, wherein said SCSI controller is configured to operate in LVD (low voltage differential) and SE (single ended) modes.

17. The SCSI controller of claim 16, wherein said mode that said SCSI controller is not configured to accommodate is an HVD (high voltage differential) mode.

18. The SCSI controller of claim 17, wherein said bus connects two or more SCSI controllers in a multi-initiator configuration, or a single controller in a single initiator configuration.

19. A computer system comprising:
    a bus;
    a computer readable memory unit connected to said bus;
    a processor coupled to said bus said processor for executing a method for implementing an application comprising the steps of:
    receiving a signal that prompts a SCSI controller to assume a mode that said SCSI controller is not configured to accommodate; and
    disabling a channel of said SCSI controller by entering a state that disconnects said channel of said SCSI controller from said SCSI bus.

20. The system of claim 19, wherein said receiving comprises receiving a software generated communication which facilitates the pulling up or pulling down of a signal transmitting line that is coupled to said SCSI controller.

21. The system of claim 20, wherein said disabling comprises driving the voltage level at a signal receiving pin coupled to said SCSI controller to a predetermined value with said software generated communication.

22. The system of claim 19, wherein said state comprises a tri-state condition.

23. The system of claim 22, wherein said SCSI controller is comprised of two channels.

24. The system of claim 23, wherein said channel can be enabled by driving a voltage level at a signal receiving pin to a predetermined voltage level.

25. The system of claim 19, wherein said SCSI controller is configured to operate in LVD (low voltage differential) and SE (single ended) modes.

26. The system of claim 25, wherein said mode that said SCSI controller is not configured to accommodate is an HVD (high voltage differential) mode.

27. The system of claim 26, wherein said bus connects two or more SCSI controllers in a multi-initiator configuration, or a single controller in a single initiator configuration.

28. A system comprising:
    a first SCSI controller having first and second channels and a signal receiving pin associated with each channel; and
    a second SCSI controller having first and second channels and a signal receiving pin associated with each channel, wherein said second channel of said first SCSI controller and said second channel of said second SCSI controller are coupled to receive a signal that disables at least one SCSI controller channel by placing said at least one SCSI controller channel in a tri-state condition.

29. The system of claim 28, wherein said second channel of said first SCSI controller and said second channel of said second SCSI controller are coupled to receive a software generated communication which facilitates the pulling up or pulling down of a signal transmitting line that is coupled to said SCSI controller.

30. The system of claim 29, wherein a signal receiving pin coupled to said first SCSI controller is driven to a predetermined value with said software generated communication.

31. The system of claim 30, wherein said at least one SCSI controller channel can be enabled by driving a voltage level at said signal receiving pin to a predetermined voltage level.

32. The system of claim 28, wherein said system is configured to operate in LVD (low voltage differential) and SE (single ended) modes.

33. The system of claim 32, wherein said system is not configured to accommodate an HVD (high voltage differential) mode.

34. A system for disconnecting a channel of a SCSI (small computer system interface) controller from a SCSI bus comprising:
  means for receiving a signal that prompts said SCSI controller to assume a mode that said SCSI controller is not configured to accommodate; and
  means for disabling a channel of said SCSI controller said means disabling a channel of said SCSI controller by entering a state that disconnects said channel of said SCSI controller from said SCSI bus.

35. The system of claim 34, wherein said means for receiving receives a software generated communication which facilitates the pulling up or pulling down of a signal transmitting line that is coupled to said SCSI controller.

36. The system of claim 35, wherein said means for disabling disables a channel of the SCSI controller when said signal receiving pin coupled to said SCSI controller is driven to a predetermined value with said software generated communication.

37. The system of claim 36, wherein said state comprises a tri-state condition.

38. The system of claim 37, wherein said SCSI controller is comprised of two channels.

39. The system of claim 36, wherein said channel can be enabled by driving a voltage level at a signal receiving pin to a predetermined voltage level.

40. The system of claim 34, wherein said SCSI controller is configured to operate in LVD (low voltage differential) and SE (single ended) modes.

41. The system of claim 40, wherein said mode that said SCSI controller is not configured to accommodate is an HVD (high voltage differential) mode.

42. The system of claim 41, wherein said bus connects two or more SCSI controllers in a multi-initiator configuration, or a single controller in a single initiator configuration.

* * * * *